(12) United States Patent
Muto et al.

(10) Patent No.: US 8,499,881 B2
(45) Date of Patent: Aug. 6, 2013

(54) VEHICLE

(75) Inventors: Noriyuki Muto, Wako (JP); Mitsuo Nakagawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 182 days.

(21) Appl. No.: 13/112,411

(22) Filed: May 20, 2011

(65) Prior Publication Data

US 2011/0290579 A1    Dec. 1, 2011

(30) Foreign Application Priority Data

May 31, 2010    (JP) ................................ 2010-124900

(51) Int. Cl.
*B62D 21/00*    (2006.01)
(52) U.S. Cl.
USPC ............................................ 180/291; 180/312
(58) Field of Classification Search
USPC ........................................ 180/291, 311, 312
See application file for complete search history.

(56) References Cited

U.S. PATENT DOCUMENTS

| | | | |
|---|---|---|---|
| 4,770,262 A * | 9/1988 | Yasunaga et al. | 180/68.1 |
| 6,971,371 B2 * | 12/2005 | Hotta et al. | 123/470 |
| 7,207,408 B2 * | 4/2007 | Kuroki et al. | 180/210 |
| 7,311,167 B2 * | 12/2007 | Takayanagi et al. | 180/215 |
| 7,815,008 B2 * | 10/2010 | Poglavec | 180/311 |
| 7,950,490 B2 * | 5/2011 | Yasuda et al. | 180/291 |
| 7,950,491 B2 * | 5/2011 | Isoda et al. | 180/311 |
| 8,312,954 B2 * | 11/2012 | Johnson et al. | 180/220 |

FOREIGN PATENT DOCUMENTS

| | | |
|---|---|---|
| JP | 60-255593 | 12/1985 |
| JP | 2001-130469 A | 5/2001 |

\* cited by examiner

*Primary Examiner* — John Walters
*Assistant Examiner* — Brian Swenson
(74) *Attorney, Agent, or Firm* — Squire Sanders (US) LLP

(57) ABSTRACT

An upper pipe 55 includes a single front pipe portion 68, a branch portion 69 bifurcated from the rear end of the front pipe portion 68, and two left and right rear pipe portions 71L, 71R extending vehicle-rearward from the branch portion 69. A cylinder head cover 58 is located between the two left and right rear pipe portions 71L, 71R as viewed from above. Therefore, the cylinder head cover 58 can be accessed from above and removed from a cylinder head, whereby a valve train chamber can be inspected and maintained.

17 Claims, 15 Drawing Sheets

(a)

(b)

(a)

(b)

(a)

(b)

(c)

VEHICLE

BACKGROUND

1. Field

Embodiments of the present invention relate to improvements in the vehicle frame structure of a vehicle, such as an all terrain vehicle.

2. Description of the Related Art

All terrain vehicles often employ a body frame formed by assembling pipes or plates in a tower-like form.

As illustrated in FIG. 1 of Japanese Patent Laid-Open No. Sho 60-255593, a main pipe extends from a head pipe in a longitudinal direction of a vehicle. Seat pillar tubes extend from a longitudinally intermediate portion of the main pipe. Down tubes extend downward from the head pipe and then toward the rear of the vehicle. An engine is supported by the down tubes and the seat pillar tubes.

As illustrated in FIG. 2 of Japanese Patent Laid-Open No. Sho 60-255593, the down tubes are composed of two left and right tubes. Also the seat pillar tubes are composed of two left and right tubes. A body frame is assembled in a tower-like form. The main pipe extends from the head pipe in such a form as to cross immediately above the engine.

In FIG. 1 of Japanese Patent Laid-Open No. Sho 60-255593, the engine is mounted on the body frame by being shifted in the left-right direction of the vehicle body in an assembly plant. After the vehicle has been delivered to a user, the engine undergoes inspection and maintenance, and repair while remaining mounted on the body frame.

The engine is composed of a crankcase, a cylinder extending upward from the crankcase, a cylinder head allowed to overlap the cylinder, and a cylinder head cover put on the cylinder head. As illustrated in FIG. 1 of Japanese Patent Laid-Open No. Sho 60-255593, the uppermost cylinder head cover is close to the main pipe.

A valve train mechanism (a rocker arm, a camshaft, a valve stem, etc.) is disposed inside the cylinder head cover. Because of its complicated structure, the valve train mechanism needs to undergo inspection and maintenance. To remove the cylinder head cover from the cylinder head, it is necessary to ensure a sufficiently large clearance between the cylinder head cover and the main pipe.

Further, considering the replacement of a piston ring, it is desirable that the cylinder head and the cylinder (the cylinder block) be removed from the crankcase. To do so, it is necessary to further increase the sufficiently large clearance between the cylinder head cover and the main pipe. However, if the clearance is enlarged as mentioned above, it is necessary to further raise the main pipe, with the result that the body frame is enlarged.

Amid the demand for the downsizing and weight reduction of vehicles, the enlargement of the body frame is not preferable. Therefore, a technology is required that can downsize the body frame of a vehicle whose main pipe is disposed immediately above an engine.

SUMMARY

It is an object of certain embodiments of the present invention to provide a technology that can downsize the body frame of a vehicle whose main pipe (e.g., upper pipe) is disposed immediately above an engine.

One embodiment of the invention is directed to a vehicle including an internal combustion engine transmitting power to at least one of a front wheel and a rear wheel. The internal combustion engine is mounted on a vehicle frame. A cylinder of the internal combustion engine extends upward and a cylinder head cover is placed on an upper end of the cylinder. The body frame includes an upper pipe extending in the longitudinal direction of the vehicle at a position above the internal combustion engine. The upper pipe includes a single front pipe portion, a branch portion bifurcated from an rear end of the front pipe portion, and two left and right rear pipe portions extending vehicle-rearward from the branch portion. The branch portion is located vehicle-forward of the cylinder head cover so that the cylinder head cover is located between the two left and right rear pipe portions as viewed from above.

According to an embodiment, an air cleaner and electric device storage box having a left chamber and a right chamber juxtaposed in a vehicle-widthwise direction is mounted to the front pipe portion. An air cleaner is housed in one of the left chamber and the right chamber and an electric device is housed in the other.

In one embodiment, a throttle body configured to control intake air supplied to the internal combustion engine is disposed between the two left and right rear pipe portions in a plan view. A connecting tube connecting the air cleaner with the throttle body extends from the air cleaner, passes through between the two left and right rear pipe portions, and terminates at the throttle body.

According to another embodiment, a seat on which an occupant may sit is disposed vehicle-rearward of the air cleaner and electric device storage box. The seat may be arcuate in vehicle-widthwise section, and have a groove-like recessed portion recessed upward at the center of a bottom and extending in the longitudinal direction of the vehicle. is the seat may be supported by the two left and right rear pipe portions, and a portion of the connecting tube is housed in the recessed portion.

In another embodiment, the internal combustion engine is mounted on the body frame via a plurality of engine mounts. At least one of the engine mounts is installed on the upper pipe at a position close to the branch portion.

According to an embodiment, the body frame includes a pair of left and right main frames extending in the longitudinal direction of the vehicle at a position below the internal combustion engine and then extending upward. The body frame also includes left and right seat rails extending vehicle-rearward from corresponding rear ends of the main frames and supporting a rear portion of the seat. Rail side collars extending in the longitudinal direction of the vehicle are provided at corresponding leading ends of the left and right seat rails. Pipe side collars extending in the longitudinal direction of the vehicle are provided at a rear end of the upper pipe, and the rail side collars and the pipe side collars are fastened to each other by means of bolts extending in the longitudinal direction of the vehicle.

In one embodiment, front wheel suspension support portions, which may be formed of a pipe or plate and suspend the front wheel, extend upward from corresponding front portions of the main frames. An upper pipe front support portion formed of a pipe and supporting a front portion of the upper pipe extends vehicle-rearward from the front wheel suspension support portions. Support portion side collars extending in the longitudinal direction of the vehicle are provided at the upper pipe front support portion, and a front portion of the upper pipe is fastened to the support portion side collars by means of bolts extending in the longitudinal direction of the vehicle.

According to one embodiment, the upper pipe includes a first member connecting one rear pipe portion of two left and right rear pipe portions with the single front pipe portion, and a second member composed of the other rear pipe portion of the two left and right rear pipe portions. A leading end of the second member is welded to the first member at the branch portion.

Another embodiment is directed to a vehicle including transmitting means for transmitting power to at least one of a front wheel and a rear wheel, and supporting means for supporting the transmitting means. The vehicle further includes housing means, extending upward, for housing a reciprocating means, and covering means for covering an upper end of the housing means. The supporting means includes upper pipe means for extending in the longitudinal direction of the vehicle at a position above the transmitting means. The upper pipe means includes a single front pipe portion, a branch portion bifurcated from a rear end of the front pipe portion, and two left and right rear pipe portions extending vehicle-rearward from the branch portion. The branch portion is located vehicle-forward of the covering means so that the covering means is located between the two left and right rear pipe portions.

Another embodiment is directed to a method including providing a body frame to support an engine transmitting power to at least one of a front wheel and a rear wheel of a vehicle, and configuring a cylinder to extend upward. The method also includes providing a cylinder head cover for placement on an upper end of the cylinder, extending an upper pipe of the body frame in the longitudinal direction of the vehicle at a position above the engine, and configuring the upper pipe to include a single front pipe portion, a branch portion bifurcated from a rear end of the front pipe portion, and two left and right rear pipe portions extending vehicle-rearward from the branch portion. The method further includes positioning the branch portion vehicle-forward of the cylinder head cover so that the cylinder head cover is located between the two left and right rear pipe portions.

DETAILED DESCRIPTION

Figure 1:
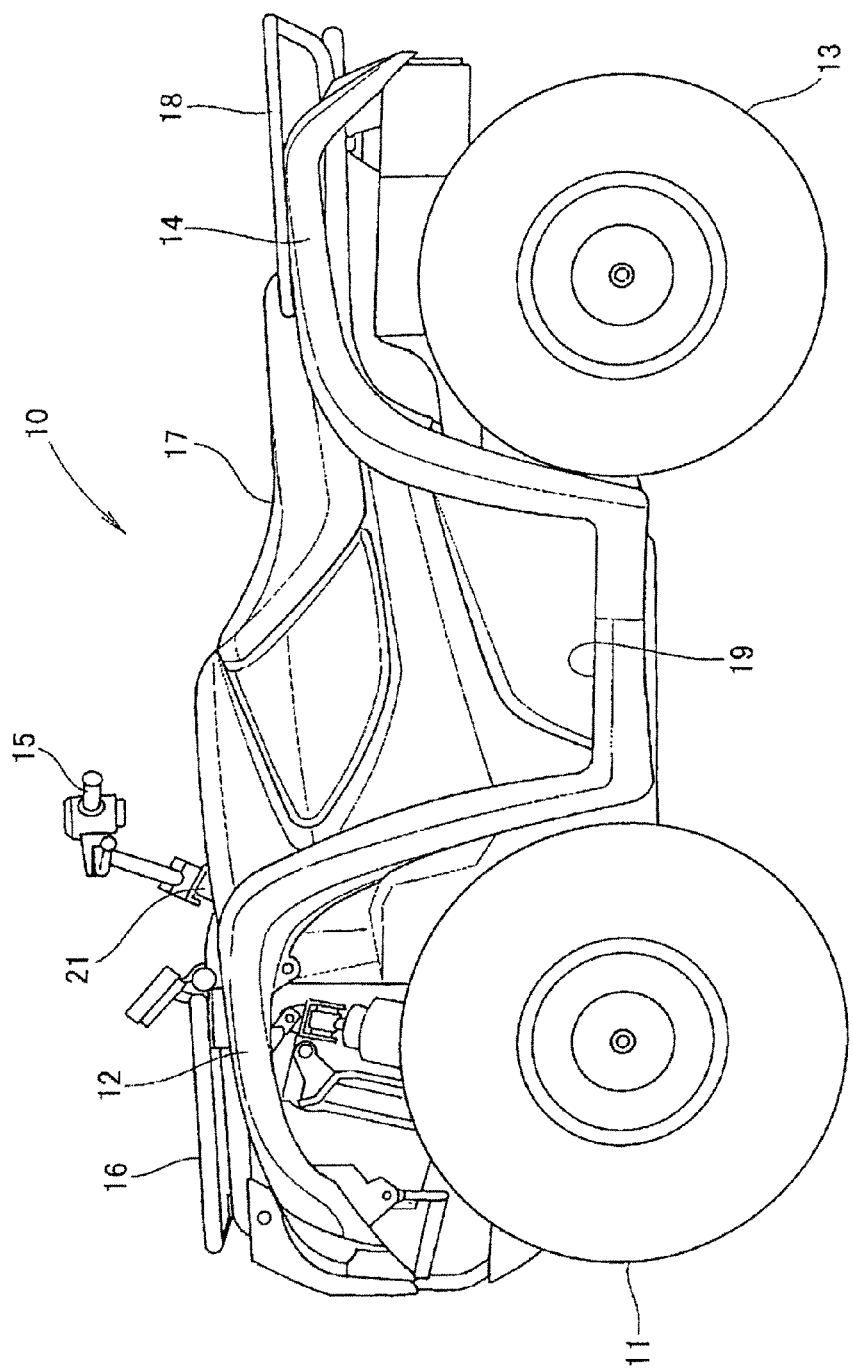
FIG. 1 is a left lateral view of a vehicle according to an embodiment of the present invention.

Embodiments of the present invention will hereinafter be described with reference to the accompanying drawings. It is to be noted that the drawings shall be viewed in the direction of reference numerals.

Referring to the embodiment illustrated in FIG. 1, a vehicle 10 includes a front wheel 11 at a front lower portion of a vehicle body, a front fender 12 above the front wheel 11, a rear wheel 13 at a rear lower portion of the vehicle body, and a rear fender 14 above the rear wheel 13. A steering handlebar 15 or other steering mechanism is provided above the front wheel 11. A front luggage carrier 16 may be provided in front of the steering handlebar 15, and a seat 17 and a rear luggage carrier 18 may be provided in the rear of the steering handlebar 15.

In one embodiment, the front wheel 11 and the rear wheel 13 may include special tires called balloon tires each having wide width and lower pressure. In such a case, the low pressure tire is deformed to absorb the irregularity of a road surface. In addition, even if the road surface is soft, the tire having a wide width can suppress its sinking. Thus, such a vehicle 10 may be referred to as an all terrain vehicle.

Figure 2:
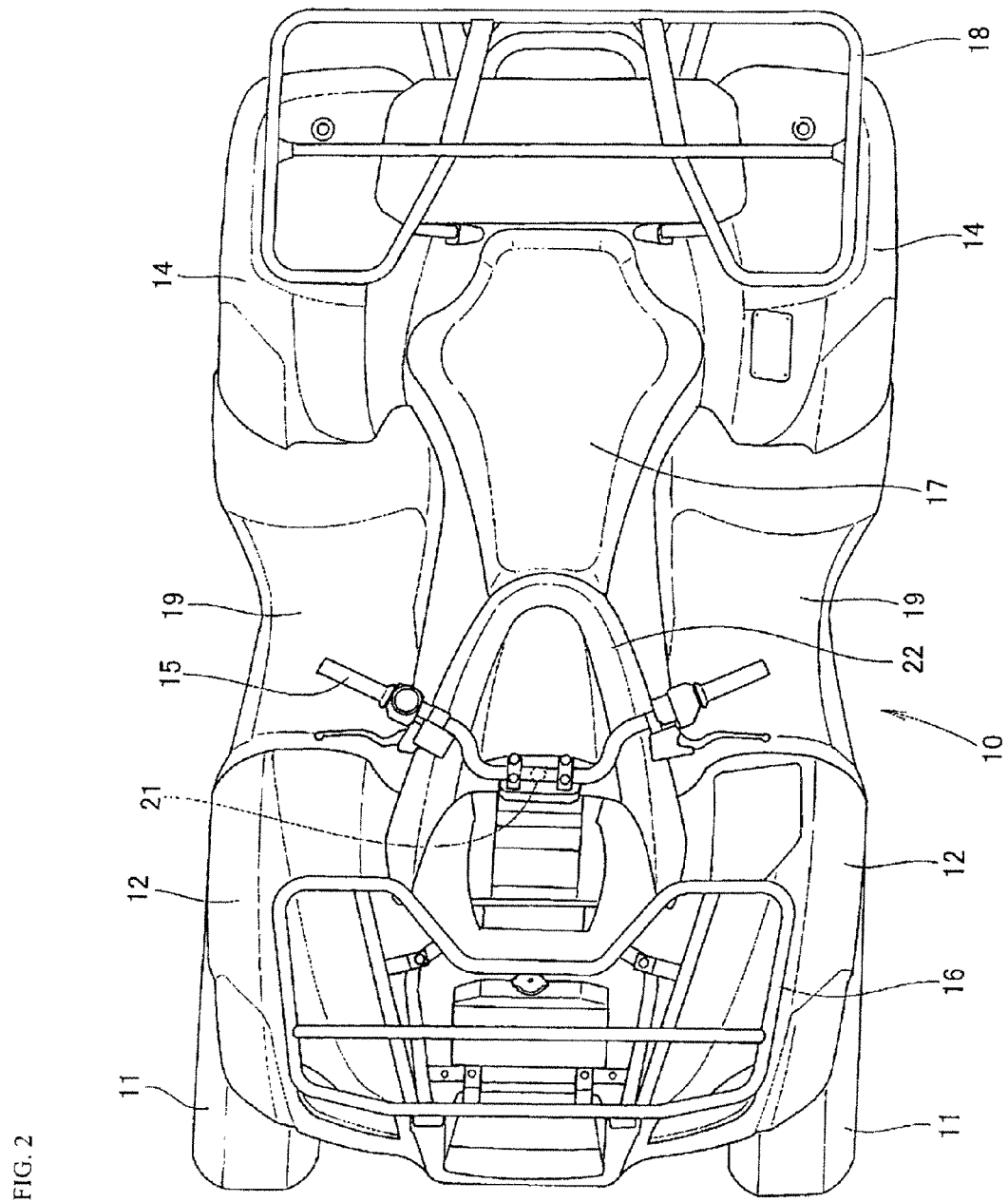
FIG. 2 is a plan view of the vehicle.

Referring to the embodiment illustrated in FIG. 2, the vehicle 10 may be a straddle-ride type all terrain vehicle in which left and right step floors 19, 19 are located between the steering handlebar 15 and the seat 17, and the feet of an occupant sitting on the seat 17 can be put on the step floors 19, 19. The vehicle 10 is provided with a front cover 22 disposed between a steering shaft 21 and the seat 17 to cover an air cleaner and electric device storage box (reference numeral 90 in FIG. 8) as described below.

Figure 3:
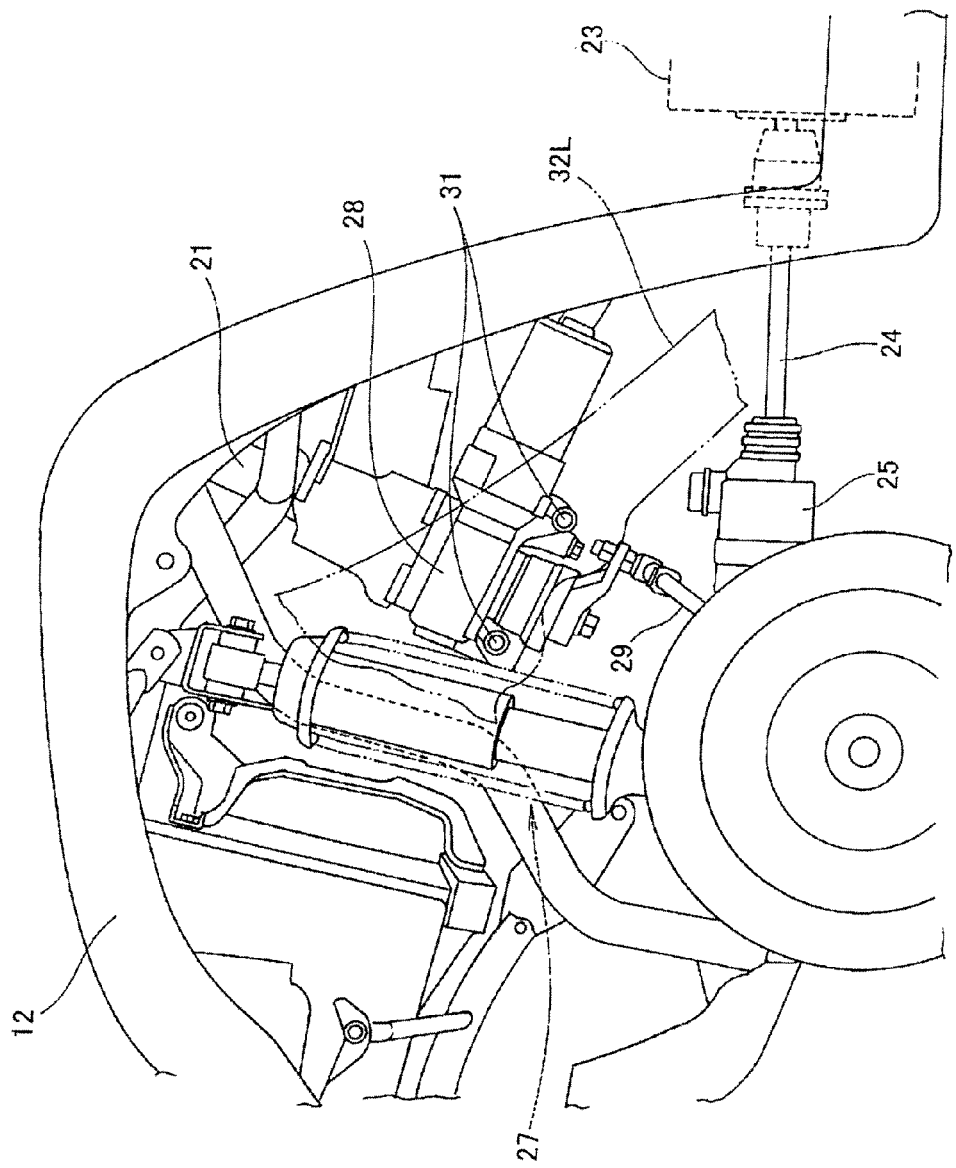
FIG. 3 is a lateral view illustrating a suspension for a front wheel.

Following is a description of a structure around the front wheel. Referring to the embodiment illustrated in FIG. 3, an internal combustion engine 23 is disposed at the center in the longitudinal direction of the vehicle. The power generated by the internal combustion engine 23 is transmitted to a final reducer 25 via a power transmission device 24, such as a propeller shaft extending vehicle-forward and the like, to drive the front wheels and the rear wheels. The internal combustion engine 23 may be a gasoline engine or diesel engine.

In the state where the front wheel is removed, a front cushion 27, a power steering unit 28 and a tie rod 29 driven by the power steering unit 28 can be seen below the front fender 12. In one embodiment, the power steering unit 28 is secured by means of bolts 31 to front tension brackets 32L, 32R denoted with dotted lines.

Figure 4:
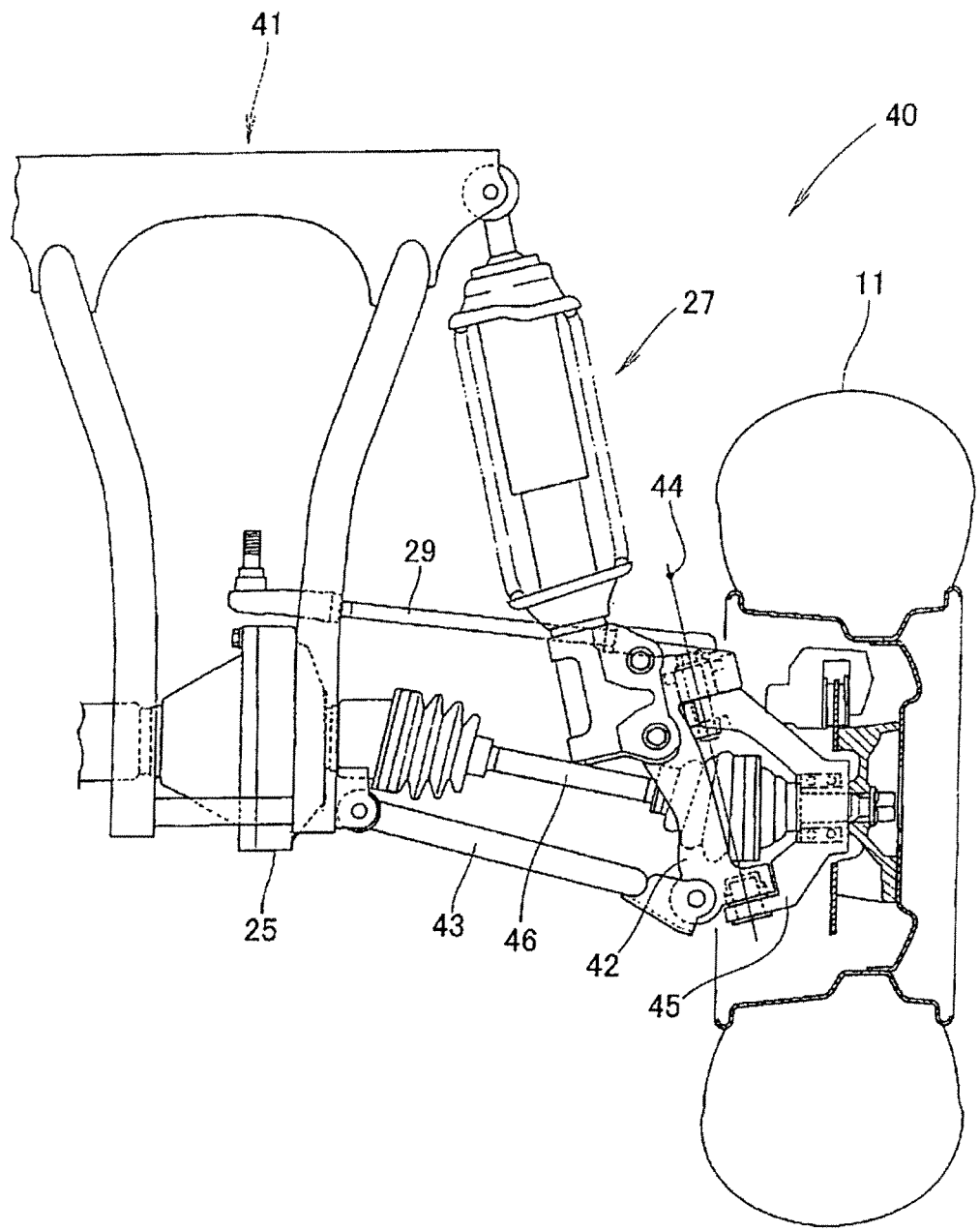
FIG. 4 is a front view illustrating the suspension for the front wheel.

Referring to the embodiment illustrated in FIG. 4, a front-wheel suspension 40 includes the front cushion 27 connected at its upper end to the body frame 41 and extending downward. A knuckle support member 42 extends downward from the lower portion of the front cushion 27. A lower arm 43 extends in a vehicle-width direction to connect the lower portion of the knuckle support member 42 with the body frame 41. A knuckle 45 is mounted to the knuckle support member 42 turnably around a king pin axis 44 and supports the front wheel 11. The tie rod 29 extends in the vehicle-width direction and turns the knuckle 45 around the king pin axis 44.

According to an embodiment, the front wheels 11 are driven by the drive shaft 46 extending from the final reducer 25 in the vehicle-width direction. The drive shaft 46 may be a flexible shaft called a constant-velocity ball joint.

A structure of the body frame 41 is next described in detail. Referring to the embodiment illustrated in FIG. 5, the body frame 41 includes as main constituents a pair of left and right main frames 51L, 51R ("L" and "R" are suffixes denoting the left and right, respectively, as viewed from the occupant, which applies to the following). The body frame also includes left and right front-wheel suspension support portions 52L, 52R, a pair of left and right seat rails 53L, 53R, rear sub-pipes 54L, 54R, and an upper pipe 55. The main frames 51L, 51R pass below the internal combustion engine 23 in the longitudinal direction of the vehicle and bends upward at its rear end. The front-wheel suspension support portions 52L, 52R are composed of pipes or frames extending upward from the corresponding front portions of the main frames 51L, 51R and support the front wheel suspension (reference numeral 40 in FIG. 4). The seat rails 53L, 53R are joined to the corresponding rear upper ends of the main frames 51L, 51R and extend in the longitudinal direction of the vehicle. The rear sub-pipes 54L, 54R are obliquely spanned from the main frames 51L, 51R to the seat rails 53L, 53R so as to suppress the deflection of the seat rails 53L, 53R. The upper pipe 55 is spanned between the front ends of the seat rails 53L, 53R and the front-wheel suspension support portions 52L, 52R so as to pass above the internal combustion engine 23.

Figure 13:
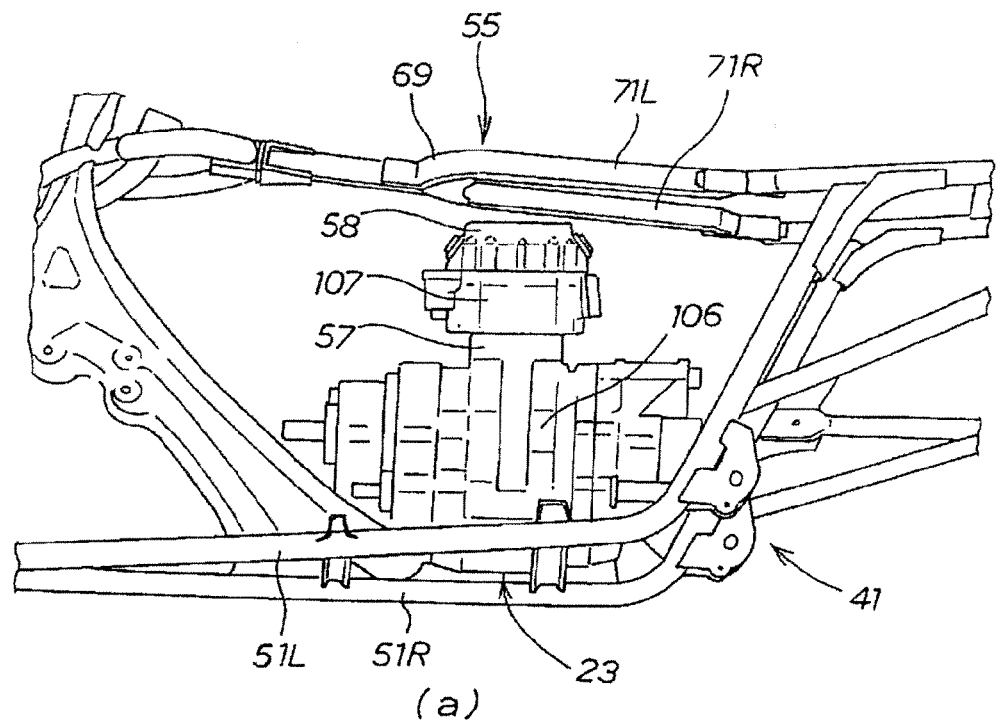
FIG. 13 is a view illustrating a procedure for removing a cylinder head cover, according to one embodiment.
Figure 13:
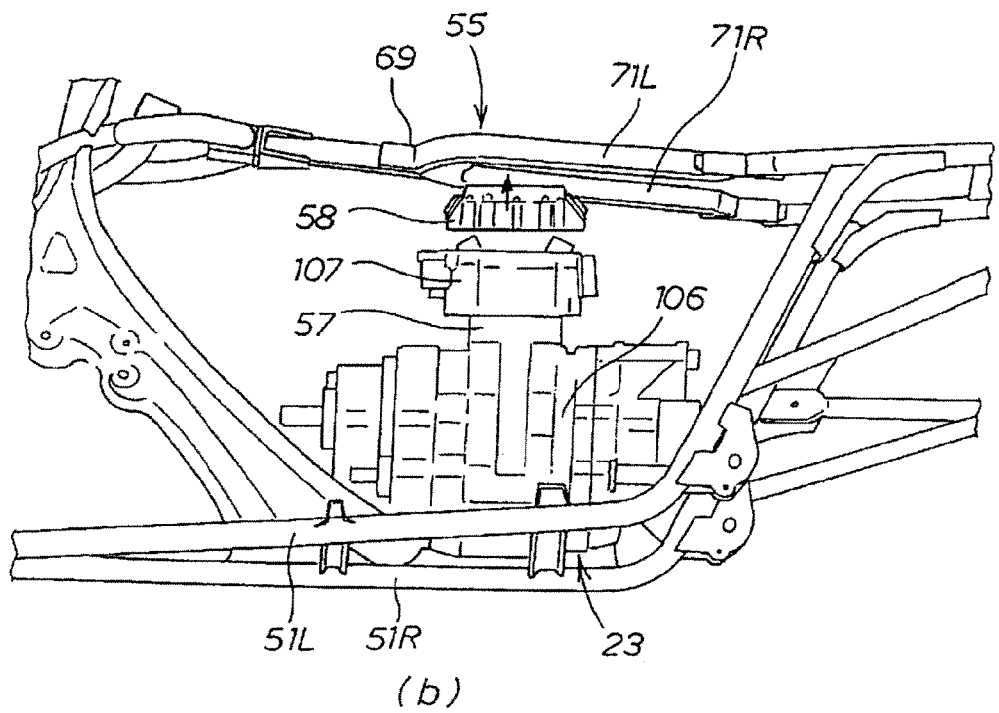

In one embodiment, a cylinder 57 of the internal combustion engine 23 extends upward. A head cover 58 may be placed on the upper end of the cylinder 57. A gap 59 between the cylinder head cover 58 and the upper pipe 55 passing above the cylinder head cover 58 is small. Incidentally, in this description, a cylinder head is omitted. The cylinder head is detailed in FIG. 13.

A throttle body 61 configured to supply intake air to the cylinder 57 is disposed vehicle-rearward of the cylinder 57, according to en embodiment. An exhaust pipe 62 configured to discharge exhaust gas extends vehicle-forward from the cylinder 57, then turns around, passes below a left rear pipe portion 71L and below a left seat rail 53L as illustrated in FIG. 6, then extends vehicle-rearward, and is coupled to a muffler 63.

Figure 6:
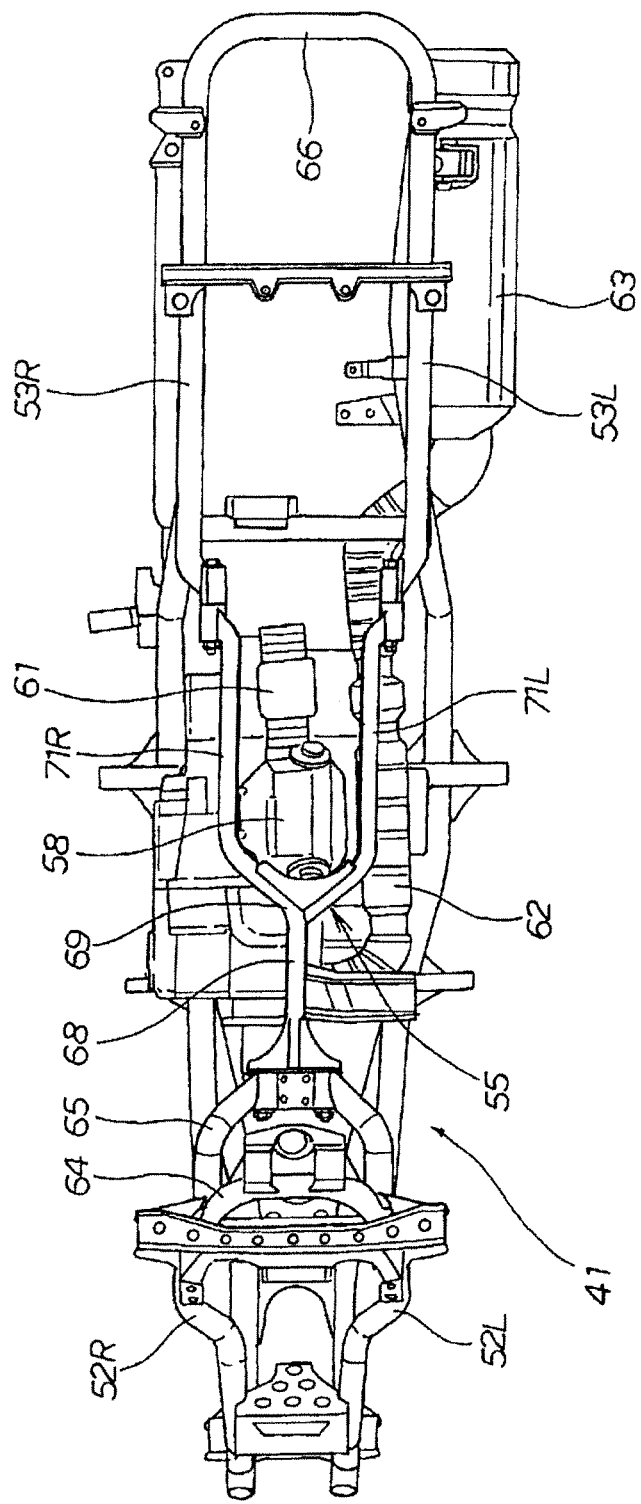
FIG. 6 is a plan view of the body frame.

As illustrated in the embodiment of FIG. 6, a first U-shaped pipe portion 64 extends vehicle-rearward from the rear ends of the left and right front wheel suspension support portions 52L, 52R. Additionally, a second U-shaped pipe portion 65 as an upper pipe front support portion extends from the rear ends of the front wheel suspension support portions 52L, 52R so as to surround the first U-shaped pipe portion 64. The upper pipe 55 is coupled to the second U-shaped pipe portion 65.

According to an embodiment, the left and right seat rails 53L, 53R are connected at their rear ends to each other via a third U-shaped pipe portion 66, so that they are composed of a single U-shaped pipe member as a whole. The upper pipe 55 is connected to the front ends of seat rails 53L, 53R, whereby the cylinder head cover 58 can be viewed from above.

The details of the upper pipes 55 are described below. Referring to the embodiment illustrated in FIG. 7, the upper pipe 55 includes a single front pipe portion 68 having triangular brackets 67L, 67R at its front end. A branch portion 69 is bifurcated leftward and rightward from the rear end of the front pipe portion 68. Two left and right rear pipe portions 71L, 71R extend vehicle-rearward from the branch portion 69. Pipe side collars 72L, 72R are coupled to corresponding rear ends of the rear pipe portions 71L, 71R and extend in the longitudinal direction of the vehicle. In one embodiment, the pipe side collar 72L is a thick cylindrical member (the same holds true for the other collars).

According to an embodiment, rail side collars 73L, 73R extending in the longitudinal direction of the vehicle are secured to the corresponding front ends of the seat rails 53L, 53R. A bolt 74 is inserted into the left rail side collar 73L from the rearward of the vehicle, the pipe side collar 72L is fitted to the bolt 74, and a nut 75 is screwed to the end of the bolt 74. Even if a gap 76 having a length L1 exists between the collars 72L, 73L before the tightening, it can be eliminated by tightening the nut 75.

In other words, the length L1 of the gap 76 is increased or decreased in the longitudinal direction of the vehicle. Therefore, the gap 76 can be eliminated by the bolt 74.

Incidentally, it is not a problem that the bolt 74 is inserted from the front of the vehicle. The same holds true for the right pipe side collar 72R and the rail side collar 73R.

In an embodiment, a bearing cap 77 is brought into contact with the first U-shaped pipe portion 64 from the vehicle-rearward direction, and fastened to the first U-shape pipe portion 64 by means of bolts 78 and nuts 79. In this way, the steering shaft (reference numeral 21 in FIG. 2) can be supported.

Support portion side collars 81L, 81R extending in the longitudinal direction of the vehicle are secured to the second U-shaped pipe portion 65, according to one embodiment. Bolts 82, 82 are passed through the triangle brackets 67L, 67R and further through the support portion side collars 81L, 81R. Nuts 83, 83 are screwed to the corresponding ends of the bolts 82, 82. Even if a gap 84 having a length L2 exists between the collar 81R and the triangular bracket 67R before tightening, it can be eliminated by tightening the nut 83. This is also because the length L2 of the gap 84 is increased or decreased in the longitudinal direction of the vehicle. Incidentally, it is not a problem that the bolts 82 are inserted from the forward of the vehicle.

As illustrated in the embodiment of FIG. 6, the cylinder head cover 58 is located between the two left and right rear pipe portions 71L, 71R as viewed from above. Therefore, the valve train chamber can be subjected to inspection and maintenance by accessing the cylinder head cover 58 from above and removing the cylinder head.

Figure 5:
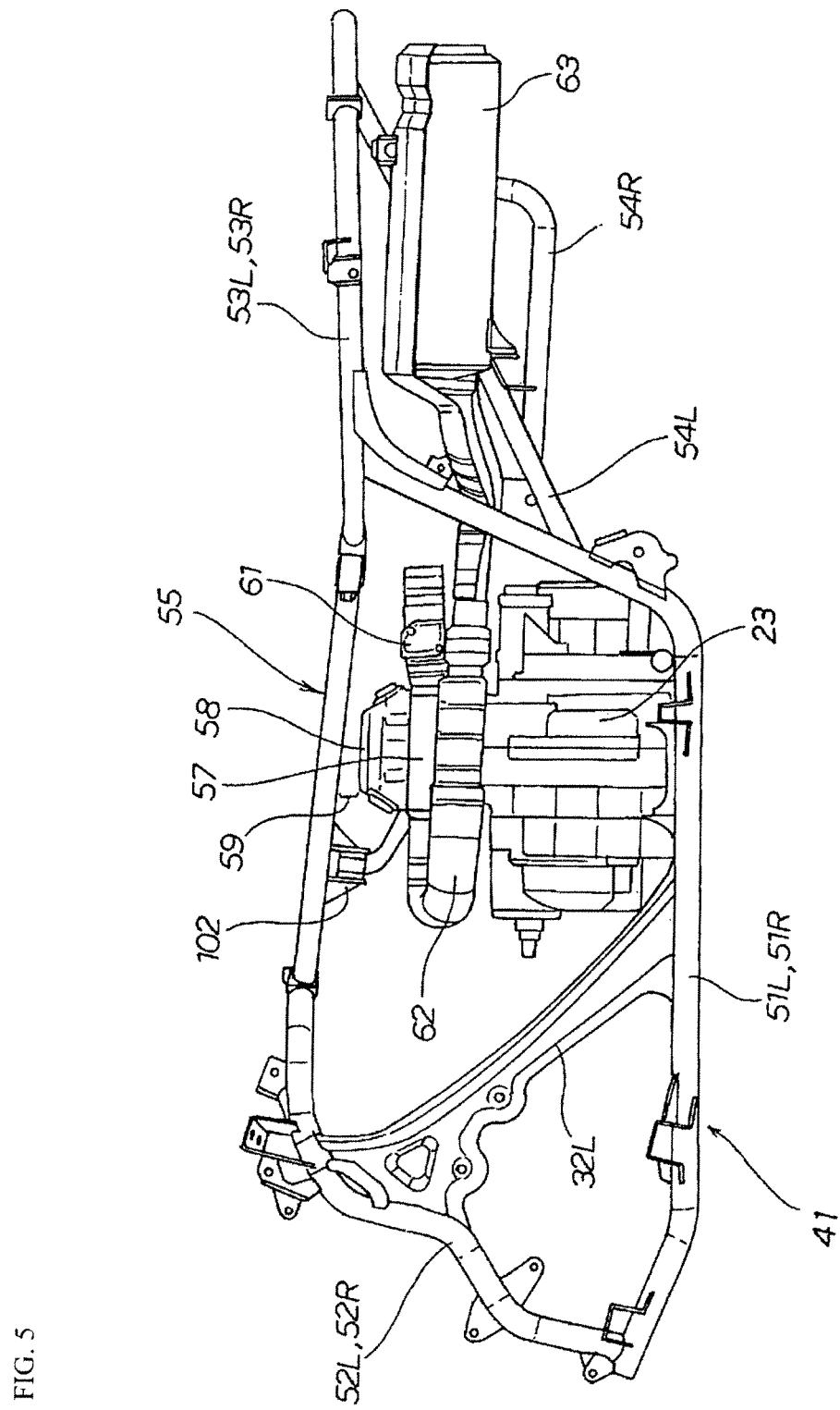
FIG. 5 is a left lateral view of a body frame.

Since the cylinder head cover 58 can be accessed from above, the gap 59 illustrated in FIG. 5 can be made as small as possible. In other words, the upper pipe 55 can be lowered close to the cylinder head cover 58. Consequently, the height of the body frame can be reduced to achieve the downsizing of the body frame.

Figure 7:
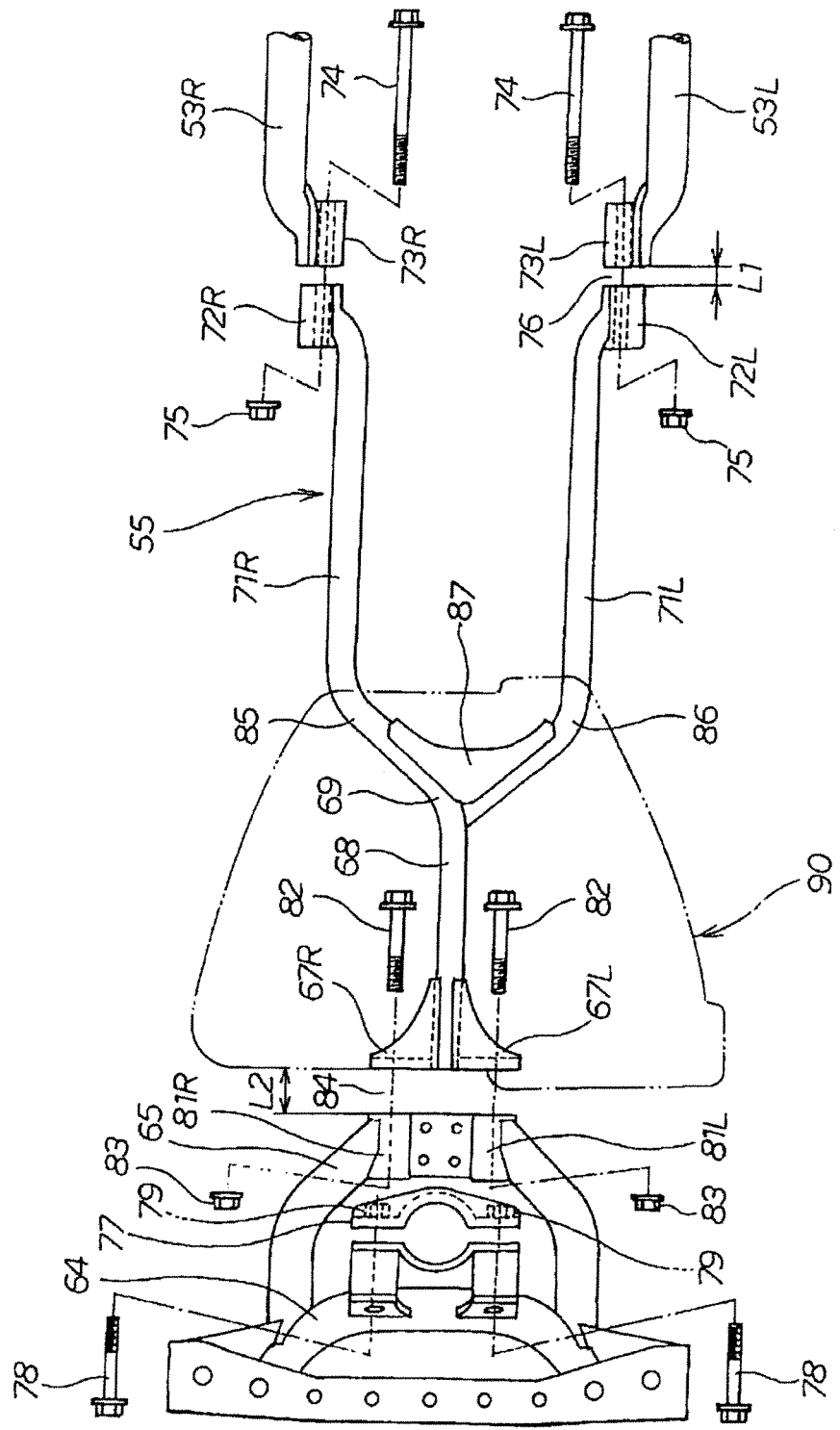
FIG. 7 is an exploded view of a portion of the body frame.

The embodiment depicted in FIG. 7 illustrates a procedure for manufacturing the upper pipe 55 that is formed in a Y-shape. A first member 85 is manufactured by bending so as to have such a shape that one, e.g., the rear pipe portion 71R, of the two left and right rear pipe portions 71L, 71R is continuous with the single front pipe portion 68.

In addition, a second member 86 is manufactured, for example, by bending so as to have the shape of the other rear pipe portion 71L of the two left and right rear pipe portions 71L, 71R. A second member 86 may be welded at its distal end with an intermediate portion of the first member 85.

The branch portion 69 is such that the two members 85, 86 are joined together, so that it has a larger sectional area than the other portions. For this reason, the branch portion 69 has high rigidity. An engine mount (reference numeral 102 in FIG. 11) can be installed close to such a branch portion 69, as described below.

Further, a triangular reinforcing plate 87 may be brought into contact with the branch portion 69 from the rearward of the vehicle and welded to the first member 85 and the second member 86.

Also, the air cleaner and electric device storage box 90 denoted with a dotted line can be mounted to the single front pipe portion 68.

Figure 8:
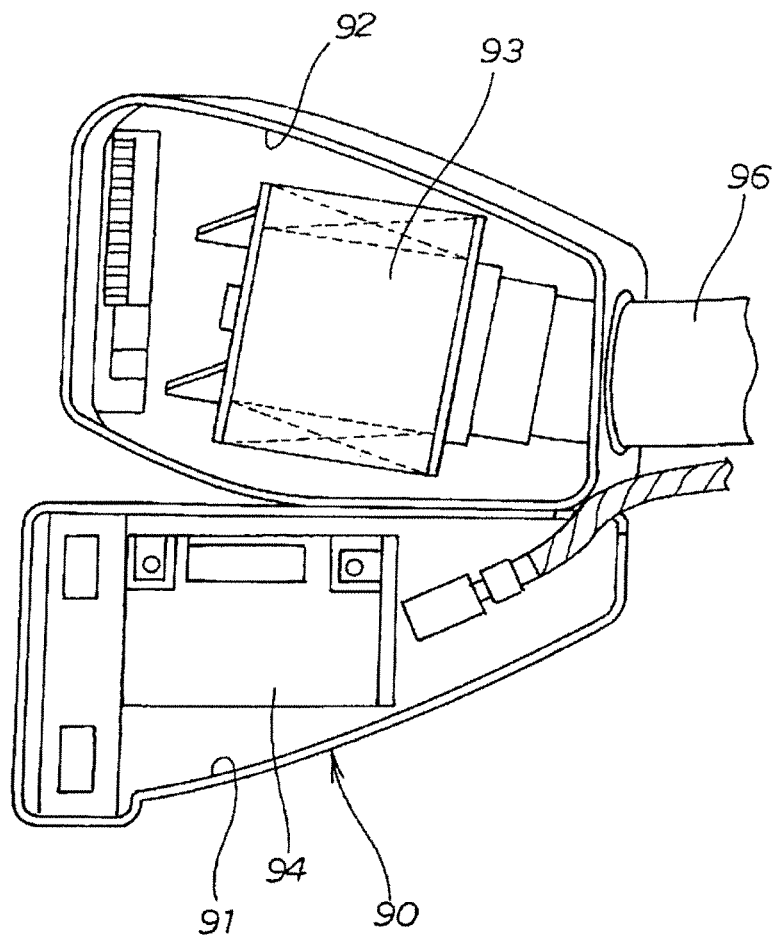
FIG. 8 is a plan view of a cleaner and electric device storage box, according to one embodiment.

Referring to the embodiment illustrated in FIG. 8, the air cleaner and electric device storage box 90 has a left chamber 91 and a right chamber 92 juxtaposed in the vehicle-width direction. An air cleaner 93 is housed in one of the left chamber 91 and the right chamber 92 (the right chamber 92 in this embodiment), and electric devices 94, such as a battery, a regulator, a fuse box, a relay, a CPU, etc., are housed in the other.

According to an embodiment, the left chamber 91 and the right chamber 92 protrude vehicle-widthwise to straddle the front pipe portion (reference numeral 68 in FIG. 7). The area below the left chamber 91 and the right chamber 92 is vacant. Therefore, the bottom of the left chamber 91 and of the right chamber 92 can be extended toward the back in the drawing, if needed. Consequently, the volume of the left chamber 91 and of the right chamber 92 can be increased easily.

Figure 9:
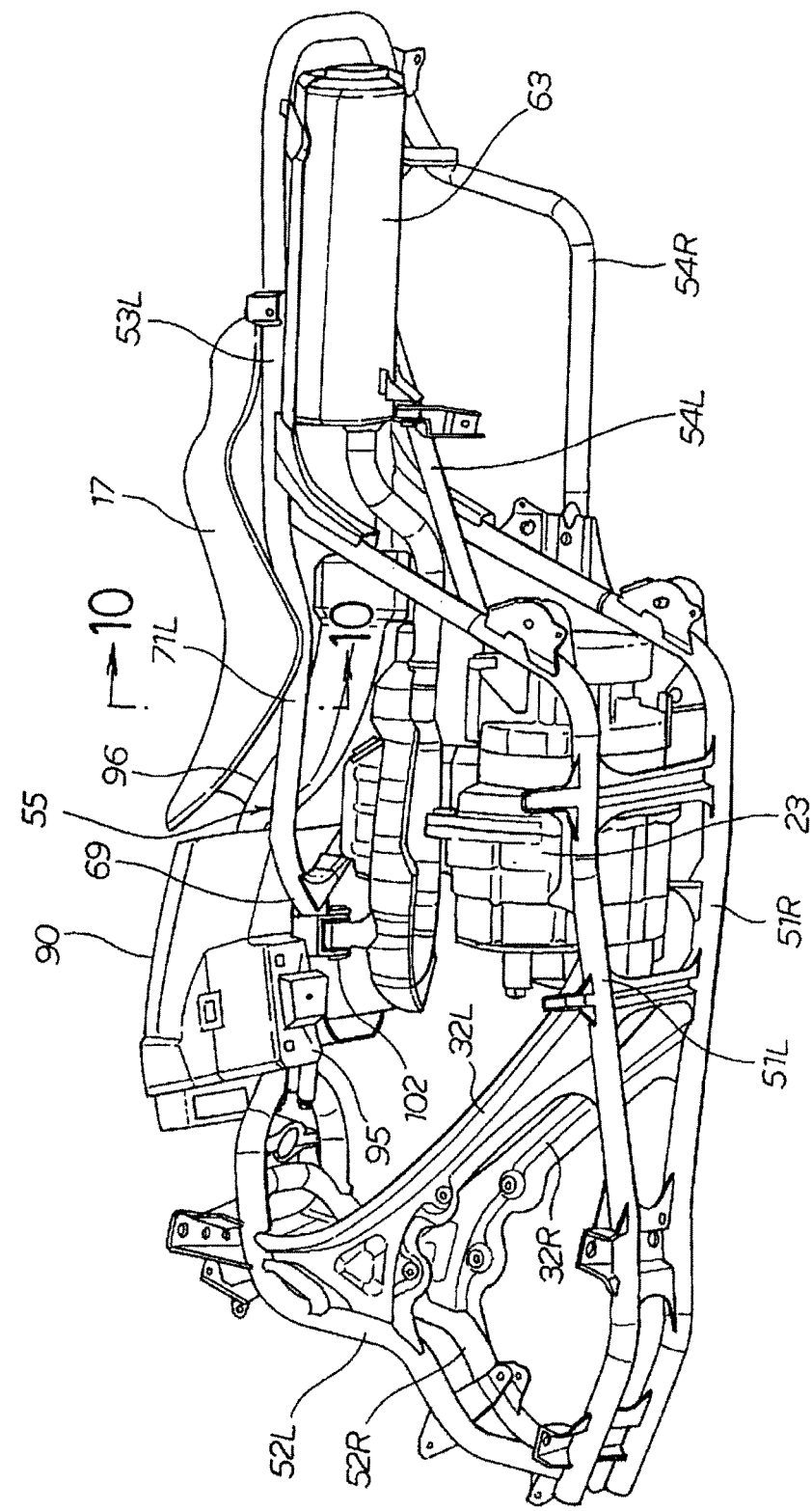
FIG. 9 is a perspective view of the body frame.

Specifically, as illustrated in the embodiment of FIG. 9, the bottom 95 of the air cleaner and electric device storage box 90 extends downward. A connecting tube 96 extends vehicle-rearward from the cleaner and electric device storage box 90; specifically, it can be bent from the upside to downside of the upper pipe 55 at a position rearward of the branch portion 69.

In one embodiment, the connecting tube 96 is joined to the throttle body 61 illustrated in FIG. 6. As shown in FIG. 6, the throttle body 61 is disposed between the left and right rear pipe portions 71L, 71R as viewed from above so that it is accessible from above similarly to the cylinder head cover 58.

Figure 10:
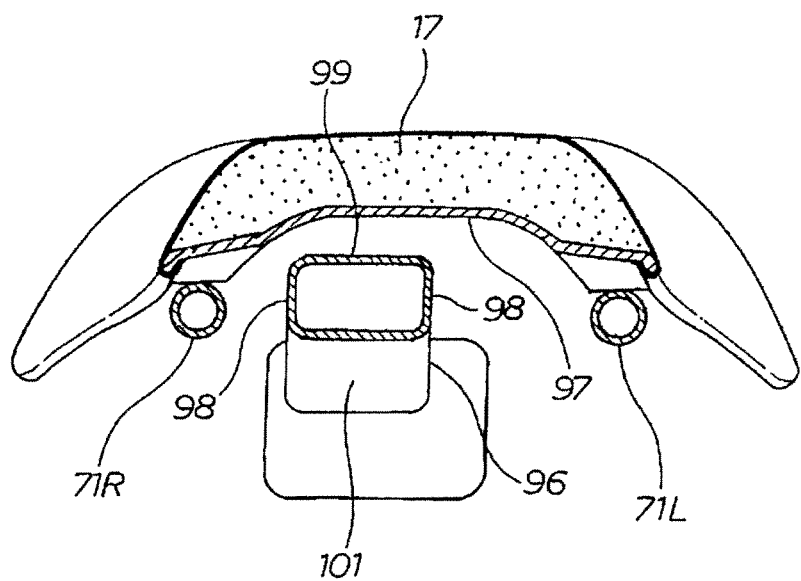
FIG. 10 is a cross-sectional view taken along line 10-10 in FIG. 9.

FIG. 10 is a cross-sectional view taken along line 10-10 in FIG. 9. According to an embodiment, the seat 17 is arcuate in the vehicle-widthwise section and has a groove-like recessed portion 97 recessed upward at the center of its bottom and extends in the longitudinal direction of the vehicle. In addition, the seat 17 may be supported by the two left and right rear pipe portions 71L, 71R. Since the seat 17 is supported by the two left and right rear pipe portions 71L, 71R, the support rigidity of the seat 17 can easily be increased.

In an embodiment, lateral surfaces 98, 98 of the connecting tube 96 are protected by the respective left and right rear portions 71L, 71R. In addition, a portion of the connecting tube 96 can be housed in the recessed portion 97 of the seat 17. An upper surface 99 of the connecting tube 96 is protected by the seat 17. A lower surface 101 of the connecting tube 96 is protected by the internal combustion engine (reference numeral 23 in FIG. 5).

Vehicles, such as all terrain vehicles have a possibility that a pebble or other debris thrown up by the front wheel may move toward the connecting tube 96. However, according to this embodiment, all of the upper surface 99, the lateral surfaces 98, 98 and the lower surface 101 are covered; therefore, there is no concern that any debris would hit the connecting tube 96.

The following is a description of the engine mount. The internal combustion engine 23 illustrated in the embodiment of FIG. 9 is connected to the left and right main frames 51L, 51R via the engine mount.

Figure 11:
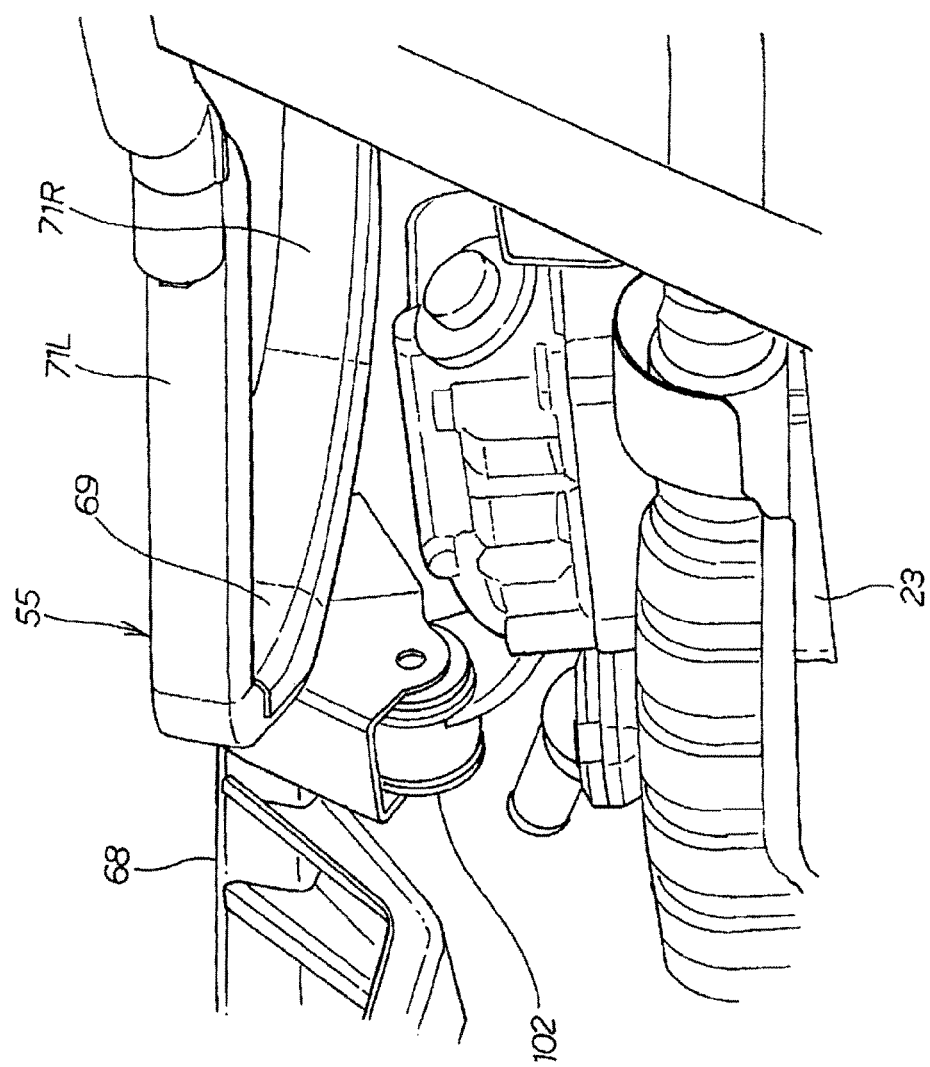
FIG. 11 is a mount view of an engine mount, according to one embodiment.

Additionally, the front upper portion of the internal combustion engine 23 is connected to the upper pipe 55 via the engine mount 102 illustrated in the embodiment of FIG. 11. The engine mount 102 may be installed close to the branch portion 69 of the upper pipe 55 (in the vicinity of between the branch portion 69 and the front pipe portion 68).

In one embodiment, the branch portion 69 has higher rigidity than the other portions in terms of structure. The engine mount 102 may be installed close to the branch portion 69 having high rigidity. Therefore, the weight of the internal combustion engine 23 can effectively be supported by the upper pipe 55.

Figure 12:
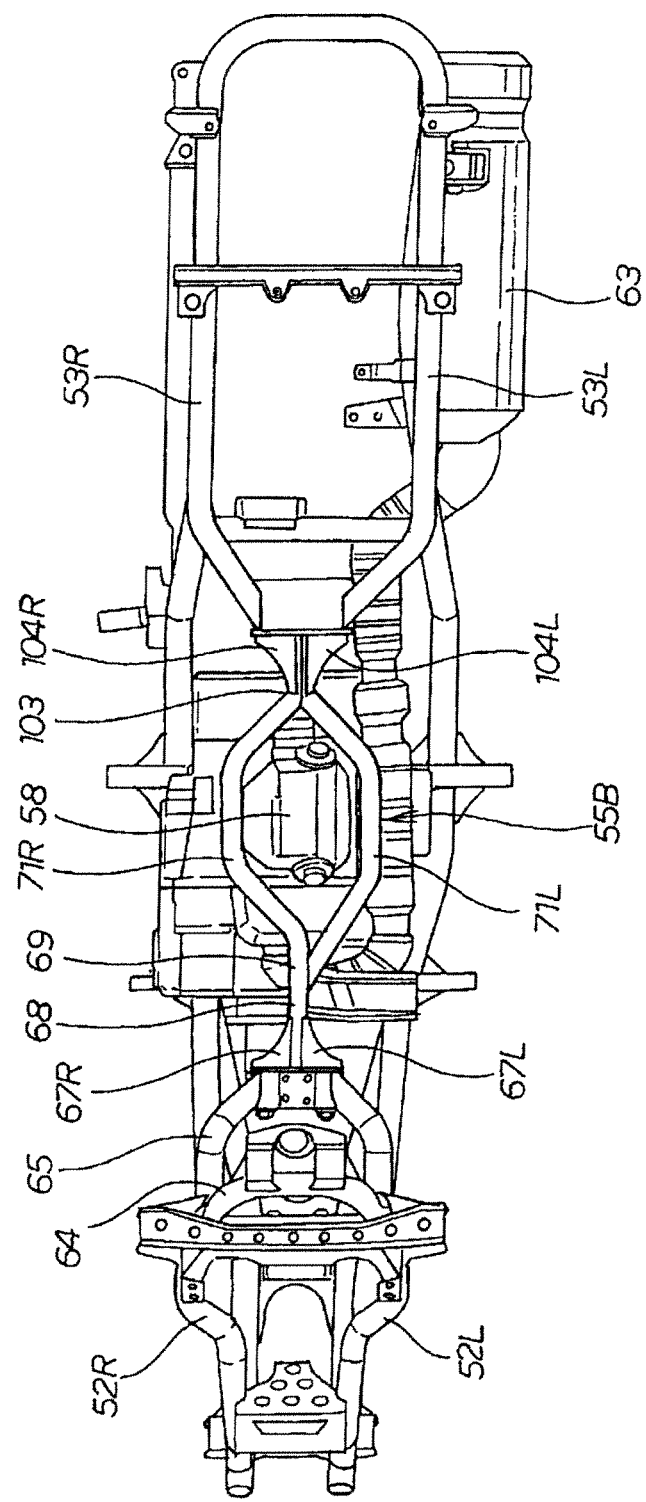
FIG. 12 illustrates another embodiment with respect to FIG. 6.

The Y-shaped upper pipe 55 is described in FIG. 6. However, the upper pipe 55 can be modified into another shape. Referring to the embodiment illustrated in FIG. 12, an upper pipe 55B has an O-shape and includes a single front pipe portion 68 having triangular brackets 67L, 67R at its front end, a branch portion 69 bifurcated from a rear end of the front pipe portion 68, and two left and right pipe portions 71L, 71R extending vehicle-rearward from the branch portion 69. A junction portion 103 joins together the rear ends of the rear pipe portions 71L, 71R, and triangular brackets 104L, 104R are provided at the junction portion 103. The cylinder head cover 58 can be viewed from above.

A description is next given of a procedure for removing the cylinder head and the cylinder (the cylinder block) while targeting the internal combustion engine 23 described in FIG. 5.

As illustrated in the embodiment of FIG. 13(a), the internal combustion engine 23 includes a crankcase 106, a cylinder 57 on the crankcase 106, a cylinder head 107 on the cylinder 57, and a cylinder head cover 58 on the cylinder head 107. Bolts fastening the cylinder head cover 58 are first loosened and removed.

As illustrated in the embodiment of FIG. 13(b), the cylinder head cover 58 is raised upward and removed upward by being passed through between the left rear pipe portion 71L and the right rear pipe portion 71R. In another embodiment, the cylinder head cover 58 may also be removed vehicle-laterally by being passed below the left rear pipe 71L or the right rear pipe 71R.

Figure 14:
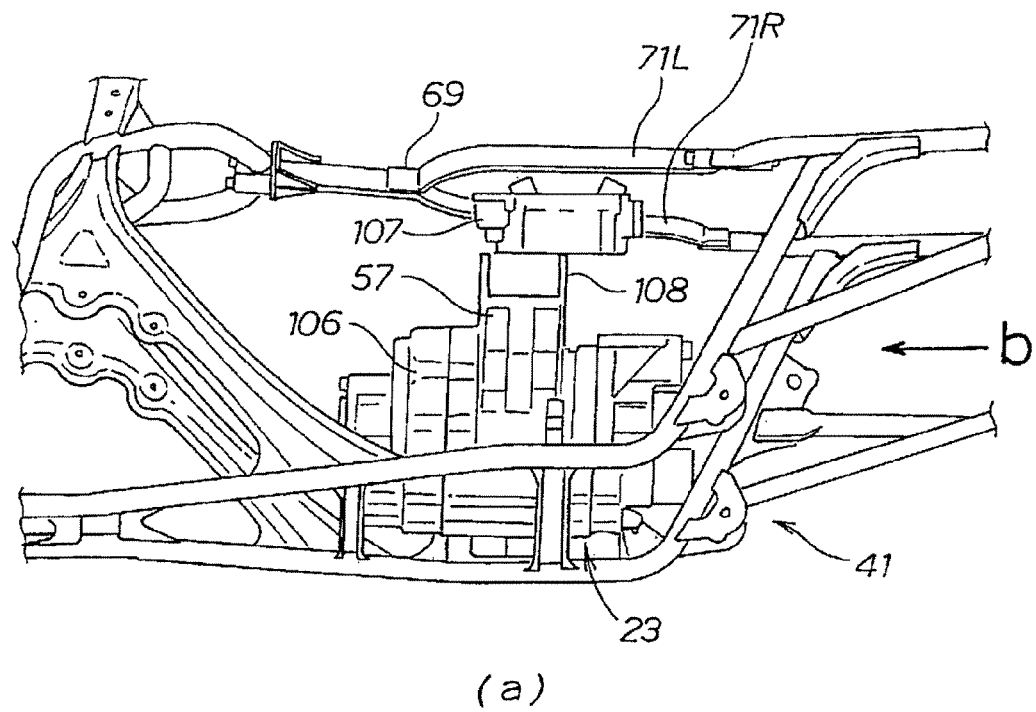
FIG. 14 is a view illustrating a procedure for removing a cylinder head, according to one embodiment.
Figure 14:
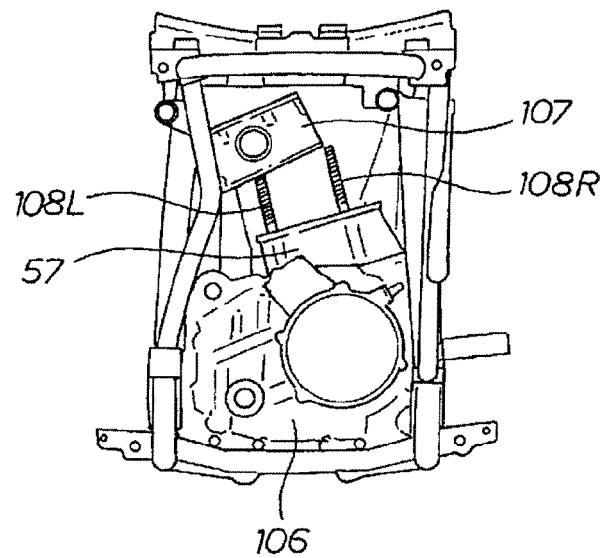

As illustrated in FIG. 14(a), the cylinder head 107 is raised while being pulled out from the stack pins 108. Then, the cylinder head 107 is removed upward by being passed through between the left rear pipe portion 71L and the right rear pipe portion 71R.

Incidentally, as illustrated in FIG. 14(b) which is a view as viewed from arrow "b" in FIG. 14(a), if the length of a left stack pin 108L is shorter than a right stack pin 108R, the cylinder head 107 can be removed leftward in the vehicle-width direction.

Figure 15:
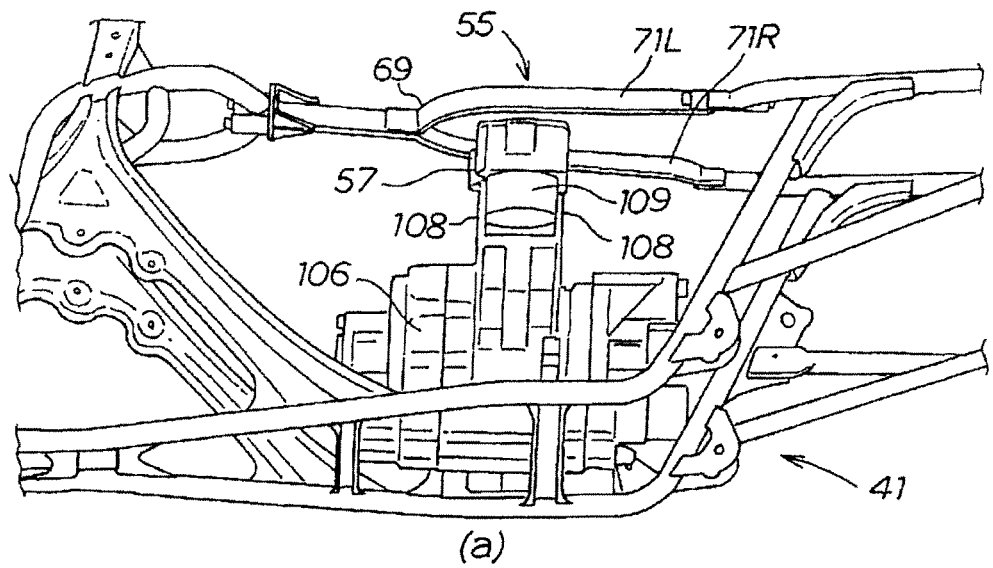
FIG. 15 is a view illustrating a procedure for removing a cylinder, according to one embodiment.
Figure 15:
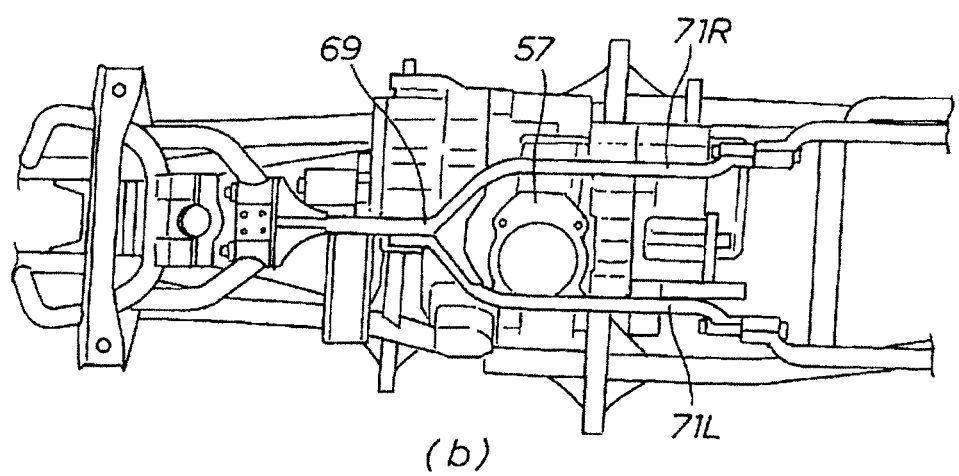
Figure 15:
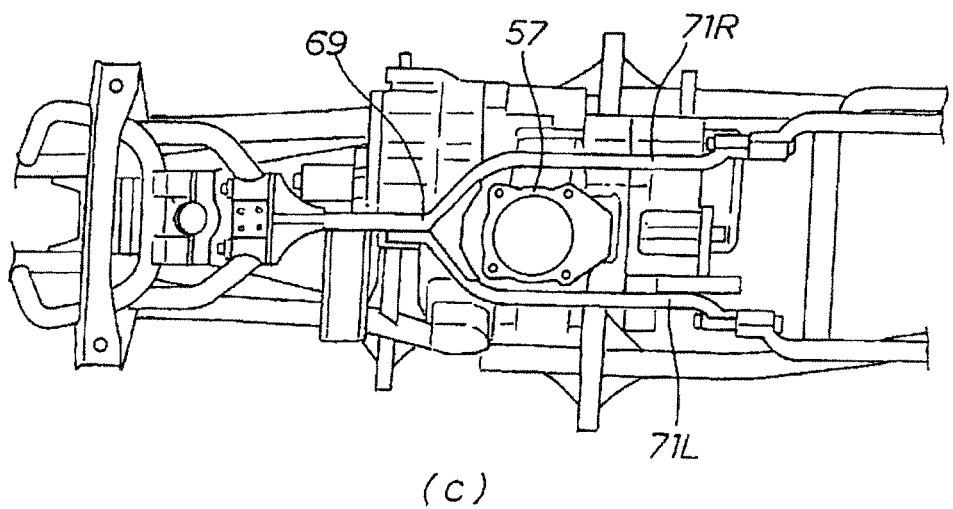

As illustrated in FIG. 15(a), the cylinder 57 is raised while being pulled out from the stack pins 108. However, the cylinder 57 cannot be removed toward the front of the drawing (laterally of the vehicle) because a sleeve 109 may get stuck with the stack pins 108, 108.

FIG. 15(b) is a plan view of FIG. 15(a). In this embodiment, the upper surface of the cylinder 57 has a vehicle-widthwise length greater than a vehicle-longitudinal length. Therefore, the cylinder 57 may get stuck with the left and right rear portions 71L, 71R. Thus, in this case, the cylinder 57 cannot be removed upward.

With that, the cylinder 57 is turned around on its vertical axis by 90°. Then, as illustrated in FIG. 15(c), the cylinder 57 can be removed upward from between the left and right rear pipe portions 71L, 71R.

As described above, according to an embodiment of the present invention, not only can the cylinder head cover (reference numeral 58 in FIG. 13) be removed but also the cylinder 57 can be removed because of employment of the Y-shaped upper pipe 55. In this case, it is not necessary to increase the height-size of the body frame 41. Consequently, the downsizing and weight reduction of the body frame can be achieved, so that the downsizing and weight reduction of the entire vehicle can be achieved.

According to an embodiment as discussed above, since the cylinder head cover is disposed between the two left and right rear pipe portions as viewed from above, the cylinder head cover can be accessed from above and removed from the cylinder head and the valve train chamber can be inspected and maintained. Further, the cylinder head can be removed.

According to an embodiment as discussed above, since the portion rearward of the branch portion is composed of the two rear pipe portions, its rigidity can be increased easily to ensure the rigidity of the upper pipe.

In one embodiment outlined above, the upper pipe can be lowered close to the cylinder head cover. Consequently, a reduction in size of the body frame can be achieved.

In an embodiment discussed above, the air cleaner and electric device storage box includes the left chamber and the right chamber juxtaposed in the vehicle-widthwise direction and is mounted to the front pipe portion. Specifically, the air cleaner and electric device storage box is installed to straddle the single front pipe portion. Laterally of and below the left chamber and the right chamber is vacant space; therefore, the bottom of the left chamber and of the right chamber can be lowered more than the front pipe portion. Consequently, the capacity of the left chamber and of the right chamber can be enlarged easily.

In an embodiment discussed above, the throttle body is disposed between the two left and right rear pipe portions as viewed from above. The throttle body can be accessed from above so that it can be inspected and maintained easily. The connecting tube extends from the air cleaner, then passes between the two left and right rear pipes, and terminates at the throttle body. The lateral surfaces of the connecting tube can be protected by the left and right rear pipe portions.

In an embodiment discussed above, the seat on which the occupant sits is arcuate in a vehicle-widthwise direction, has the groove-like recessed portion recessed upward at the center of the bottom and extending in the longitudinal direction of the vehicle, and is supported by the two left and right rear pipe portions. The seat is supported by the two left and right rear pipe portions. Accordingly, the support rigidity of the seat can be increased easily.

A portion of the connecting tube is housed in the recessed portion of the seat. Therefore, the upper surface of the connecting tube can be protected by the seat.

In an embodiment discussed above, at least one of the engine mounts is installed on the upper pipe at a position close to the branch portion. The branch portion has higher rigidity than that of the front pipe portion and of the rear pipe portion in terms of structure. The engine mounts are installed close to the branch portion having high rigidity, so that the weight of the internal combustion engine can effectively be supported by the upper pipe.

In an embodiment discussed above, the rail side collars extending in the longitudinal direction of the vehicle are provided at the corresponding leading ends of the left and right seat rails. The pipe side collars extending in the longitudinal direction of the vehicle are provided at the rear end of the upper pipe. The rail side collars and the pipe side collars are fastened to each other by means of bolts extending in the longitudinal direction of the vehicle.

If the upper pipe is to be mounted to the seat rails after having been removed from the seat rails, a gap may occur between the upper pipe and each of the seat rails in some cases. This gap is increased or decreased in the longitudinal direction of the vehicle. The gap can be eliminated by tightening up the bolts extending in the longitudinal direction of the vehicle.

In an embodiment discussed above, the support portion side collars extending in the longitudinal direction of the vehicle are provided at the upper pipe front support portion, and the front portion of the upper pipe is fastened to the support portion side collars by means of bolts extending in the longitudinal direction of the vehicle.

If the upper pipe is to be mounted to the upper pipe front support portion after having been removed from the upper pipe front support portion, a gap may occur between the upper pipe and the upper pipe front support portion in some cases. The gap is increased or decreased in the longitudinal direction of the vehicle. The gap can be eliminated by tightening up the bolts in the longitudinal direction of the vehicle.

In an embodiment discussed above, the upper pipe includes the first member connecting one rear pipe portion with the single front pipe portion and the second member composed of the other rear pipe portion of the two left and right rear pipe portions. The leading end of the second member is welded to the first member at the branch portion.

The upper pipe is Y-shaped as viewed from above. For example, the Y-shape can be manufactured by welding the leading ends of three pipes. However, this requires three parts and also the welding length is increased.

In this regard, according to an embodiment of the present invention, the leading end of the second member is brought into contact with the intermediate portion of the long first member and is welded to the first member. This results in just two parts and the welding length can be reduced.

Embodiments of the present invention are suitable for all terrain vehicles; however, the invention is not limited to one type of vehicle and embodiments thereof can be applied in general to all vehicles.

DESCRIPTION OF REFERENCE SYMBOLS

10 . . . Vehicle,
11 . . . Front wheel,
13 . . . Rear wheel,
17 . . . Seat,
23 . . . Internal combustion engine,
40 . . . Front wheel suspension,
41 . . . Body frame,
51L, 51R . . . Main frame,
52L, 52R . . . Front wheel suspension support portion,
53L, 53R . . . Seat rail,
55, 55B . . . Upper pipe,
57 . . . Cylinder,
58 . . . Cylinder head cover,
61 . . . Throttle body,
65 . . . Upper pipe front support portion (second U-shaped pipe portion),
68 . . . Front pipe portion,
69 . . . Branch portion,
71L, 71R . . . Rear pipe portion,
72L, 72R . . . Pipe side collar,
73L, 73R . . . Rail side collar,
74, 82 . . . Bolt,
81L, 81R . . . Support portion side collar,
85 . . . First member,
86 . . . Second member,
90 . . . Air cleaner and electric device storage box,
91 . . . Left chamber,
92 . . . Right chamber,
93 . . . Air cleaner,
94 . . . Electric device,
96 . . . Connecting tube,
97 . . . Recessed portion,
102 . . . Engine mount.

We claim:

1. A vehicle, comprising:
   an internal combustion engine configured to transmit power to at least one of a front wheel and a rear wheel, the internal combustion engine being mounted on a body frame;
   a cylinder of the internal combustion engine configured to extend upward;
   a cylinder head cover placed on an upper end of the cylinder;

wherein the body frame comprises an upper pipe extending in the longitudinal direction of the vehicle at a position above the internal combustion engine, and wherein the upper pipe comprises a single front pipe portion, a branch portion bifurcated from a rear end of the front pipe portion, and two left and right rear pipe portions extending vehicle-rearward from the branch portion, and the branch portion is located vehicle-forward of the cylinder head cover so that the cylinder head cover is located between the two left and right rear pipe portions; and an air cleaner and electric device storage box comprising a left chamber and a right chamber juxtaposed in a vehicle-widthwise direction, the air cleaner and electric device storage box is mounted to the front pipe portion, wherein an air cleaner is housed in one of the left chamber and the right chamber and an electric device is housed in the other.

2. The vehicle according to claim 1, further comprising a throttle body configured to control intake air supplied to the internal combustion engine, wherein the throttle body is disposed between the two left and right rear pipe portions, and wherein a connecting tube connecting the air cleaner with the throttle body extends from the air cleaner, passes between the two left and right rear pipe portions, and terminates at the throttle body.

3. The vehicle according to claim 2, further comprising a seat disposed vehicle-rearward of the air cleaner and electric device storage box, wherein the seat is arcuate in a vehicle-widthwise direction, the seat comprising a groove-like recessed portion recessed upward at the center of a bottom and extending in the longitudinal direction of the vehicle, and the seat is supported by the two left and right rear pipe portions, and wherein a portion of the connecting tube is housed in the recessed portion.

4. The vehicle according to claim 1, wherein the internal combustion engine is mounted on the body frame via a plurality of engine mounts, and at least one of the plurality of engine mounts is installed on the upper pipe at a position close to the branch portion.

5. The vehicle according to claim 1, wherein the upper pipe comprises a first member connecting one rear pipe portion of two left and right rear pipe portions with the single front pipe portion, and a second member comprising the other rear pipe portion of the two left and right rear pipe portions, wherein a leading end of the second member is welded to the first member at the branch portion.

6. A vehicle, comprising:

an internal combustion engine configured to transmit power to at least one of a front wheel and a rear wheel, the internal combustion engine being mounted on a body frame:

a cylinder of the internal combustion engine configured to extend upward;

a cylinder head cover placed on an upper end of the cylinder;

wherein the body frame comprises an upper pipe extending in the longitudinal direction of the vehicle at a position above the internal combustion engine, wherein the upper pipe comprises a single front pipe portion, a branch portion bifurcated from a rear end of the front pipe portion, and two left and right rear pipe portions extending vehicle-rearward from the branch portion, and the branch portion is located vehicle-forward of the cylinder head cover so that the cylinder head cover is located between the two left and right rear pipe portions, wherein the body frame comprises a pair of left and right main frames extending in the longitudinal direction of the vehicle at a position below the internal combustion engine and then extending upward, and a left and right seat rails extending vehicle-rearward from corresponding rear ends of the main frames and supporting a rear portion of the seat, and wherein rail side collars extending in the longitudinal direction of the vehicle are provided at corresponding leading ends of the left and right seat rails, pipe side collars extending in the longitudinal direction of the vehicle are provided at a rear end of the upper pipe, and the rail side collars and the pipe side collars are fastened to each other by means of bolts extending in the longitudinal direction of the vehicle.

7. The vehicle according to claim 6, further comprising:

front wheel suspension support portions each formed of a pipe or plate and suspending the front wheel, wherein the front wheel suspension support portions extend upward from corresponding front portions of the main frames;

an upper pipe front support portion formed of a pipe and supporting a front portion of the upper pipe, wherein the upper pipe front support portion extends vehicle-rearward from the front wheel suspension support portions;

support portion side collars extending in the longitudinal direction of the vehicle are disposed at the upper pipe front support portion, and wherein a front portion of the upper pipe is fastened to the support portion side collars by means of bolts extending in the longitudinal direction of the vehicle.

8. A vehicle, comprising:

transmitting means for transmitting power to at least one of a front wheel and a rear wheel;

supporting means for supporting the transmitting means;

housing means for housing a reciprocating means, the housing means extending upward;

covering means for covering an upper end of the housing means;

wherein the supporting means comprises upper pipe means for extending in the longitudinal direction of the vehicle at a position above the transmitting means, and wherein the upper pipe means comprises a single front pipe portion, a branch portion bifurcated from a rear end of the front pipe portion, and two left and right rear pipe portions extending vehicle-rearward from the branch portion, and the branch portion is located vehicle-forward of the covering means so that the covering means is located between the two left and right rear pipe portions; and storage means for storing an air cleaner and electric device, the storage means comprising a left chamber and a right chamber juxtaposed in a vehicle-widthwise direction, wherein the storage means is mounted to the front pipe portion, wherein the air cleaner is housed in one of the left chamber and the right chamber and the electric device is housed in the other.

9. The vehicle according to claim 8, further comprising:

controlling means for controlling intake air supplied to the transmitting means, wherein the controlling means is disposed between the two left and right rear pipe portions, and wherein connecting means for connecting the air cleaner with the controlling means extends from the air cleaner, passes between the two left and right rear pipe portions, and terminates at the controlling means.

10. The vehicle according to claim 8, further comprising:
a plurality of mounting means for mounting the transmitting means on the supporting means, and wherein at least one of the plurality of mounting means is installed on the upper pipe means at a position close to the branch portion.

11. A vehicle, comprising:
transmitting means for transmitting power to at least one of a front wheel and a rear wheel;
supporting means for supporting the transmitting means;
housing means for housing a reciprocating means, the housing means extending upward;
covering means for covering an upper end of the housing means;
wherein the supporting means comprises upper pipe means for extending in the longitudinal direction of the vehicle at a position above the transmitting means,
wherein the upper pipe means comprises a single front pipe portion, a branch portion bifurcated from a rear end of the front pipe portion, and two left and right rear pipe portions extending vehicle-rearward from the branch portion, and the branch portion is located vehicle-forward of the covering means so that the covering means is located between the two left and right rear pipe portions,
wherein the supporting means comprises a pair of left and right main frames extending in the longitudinal direction of the vehicle at a position below the transmitting means and then extending upward, and a left and right seat rails extending vehicle-rearward from corresponding rear ends of the main frames and supporting a rear portion of a seat, and
wherein rail side means for extending in the longitudinal direction of the vehicle are provided at corresponding leading ends of the left and right seat rails, pipe side means for extending in the longitudinal direction of the vehicle are provided at a rear end of the upper pipe, and the rail side means and the pipe side means are fastened to each other by fastening means extending in the longitudinal direction of the vehicle.

12. The vehicle according to claim 11, further comprising:
front suspending means for suspending the front wheel, wherein the front suspending means extend upward from corresponding front portions of the main frames;
upper pipe front supporting means for supporting a front portion of the upper pipe means, wherein the upper pipe front supporting means extends vehicle-rearward from the front suspending means; and
support portion side means for extending in the longitudinal direction of the vehicle are disposed at the upper pipe front supporting means, and wherein a front portion of the upper pipe means is fastened to the support portion side means by fastening means extending in the longitudinal direction of the vehicle.

13. A method, comprising:
providing a body frame to support an engine transmitting power to at least one of a front wheel and a rear wheel of a vehicle;
configuring a cylinder to extend upward;
providing a cylinder head cover for placement on an upper end of the cylinder;
extending an upper pipe of the body frame in the longitudinal direction of the vehicle at a position above the engine;
configuring the upper pipe to include a single front pipe portion, a branch portion bifurcated from a rear end of the front pipe portion, and two left and right rear pipe portions extending vehicle-rearward from the branch portion; and
positioning the branch portion vehicle-forward of the cylinder head cover so that the cylinder head cover is located between the two left and right rear pipe portions; and
storing an air cleaner and electric device in a storage box, the storage box comprising a left chamber and a right chamber juxtaposed in a vehicle-widthwise direction, and mounting the storage box to the front pipe portion, wherein the air cleaner is housed in one of the left chamber and the right chamber and the electric device is housed in the other.

14. The method according to claim 13, further comprising:
controlling, by a throttle body, intake air supplied to the engine;
disposing the throttle body between the two left and right rear pipe portions; and
connecting, by a tube, the air cleaner with the throttle body, wherein the tube extends from the air cleaner, passes between the two left and right rear pipe portions, and terminates at the throttle body.

15. The method according to claim 13, further comprising:
mounting, by a plurality of engine mounts, the engine on the body frame; and
installing at least one of the plurality of engine mounts on the upper pipe at a position close to the branch portion.

16. A method, comprising:
providing a body frame to support an engine transmitting power to at least one of a front wheel and a rear wheel of a vehicle;
configuring a cylinder to extend upward;
providing a cylinder head cover for placement on an upper end of the cylinder;
extending an upper pipe of the body frame in the longitudinal direction of the vehicle at a position above the engine;
configuring the upper pipe to include a single front pipe portion, a branch portion bifurcated from a rear end of the front pipe portion, and two left and right rear pipe portions extending vehicle-rearward from the branch portion; and
positioning the branch portion vehicle-forward of the cylinder head cover so that the cylinder head cover is located between the two left and right rear pipe portions;
configuring the body frame to include a pair of left and right main frames extending in the longitudinal direction of the vehicle at a position below the engine and then extending upward;
extending left and right seat rails vehicle-rearward from corresponding rear ends of the main frames, the left and right seat rails supporting a rear portion of a seat;
providing rail side collars extending in the longitudinal direction of the vehicle at corresponding leading ends of the left and right seat rails;
providing pipe side collars extending in the longitudinal direction of the vehicle at a rear end of the upper pipe; and fastening the rail side collars and the pipe side collars to each other by means of bolts extending in the longitudinal direction of the vehicle.

17. The method according to claim 16, further comprising:

extending front wheel suspension support portions formed of a pipe or plate upward from corresponding front portions of the main frames;

supporting a front portion of the upper pipe by an upper pipe front support portion extending vehicle-rearward from the front wheel suspension support;
   disposing support portion side collars extending in the longitudinal direction of the vehicle at the upper pipe front support portion; and
   fastening a front portion of the upper pipe means the support portion side collars by bolts extending in the longitudinal direction of the vehicle.

* * * * *